US006928654B2

(12) United States Patent
Tranchina et al.

(10) Patent No.: US 6,928,654 B2
(45) Date of Patent: Aug. 9, 2005

(54) VEHICLE DISPLAY DEVICE FOR SIMULTANEOUSLY DISPLAYING ONE OR MORE VIDEO PROGRAMS ON SEPARATE DISPLAYS

(75) Inventors: James R. Tranchina, Dix Hills, NY (US); George Schedivy, Aquebogue, NY (US); Jeff Macholz, Islip, NY (US)

(73) Assignee: Audiovox Corporation, Hauppauge, NY (US)

( * ) Notice: Subject to any disclaimer, the term of this patent is extended or adjusted under 35 U.S.C. 154(b) by 113 days.

(21) Appl. No.: 10/037,321

(22) Filed: Jan. 4, 2002

(65) Prior Publication Data

US 2002/0105507 A1 Aug. 8, 2002

Related U.S. Application Data

(63) Continuation-in-part of application No. 09/698,916, filed on Oct. 27, 2000.

(51) Int. Cl.[7] .................................................. H04N 7/18
(52) U.S. Cl. ............................. 725/75; 725/38; 725/40; 725/59; 348/837
(58) Field of Search ............................. 725/38, 40, 59, 725/75; 348/564, 751, 790, 837

(56) References Cited

U.S. PATENT DOCUMENTS

| D275,819 S | 10/1984 | Leiserson ..................... D3/33 |
| 4,658,298 A | 4/1987 | Takeda et al. ............... 358/254 |
| 5,044,321 A | 9/1991 | Selph .......................... 119/96 |
| 5,326,175 A | 7/1994 | Carter .......................... 383/22 |
| 5,555,466 A | 9/1996 | Scribner et al. ................ 348/8 |
| 5,790,787 A * | 8/1998 | Scott et al. |
| 5,794,164 A * | 8/1998 | Beckert et al. |
| 5,868,294 A | 2/1999 | Webster ...................... 224/275 |
| 5,957,985 A * | 9/1999 | Wong et al. |
| 6,057,814 A * | 5/2000 | Kalt |
| 6,058,288 A * | 5/2000 | Reed et al. |
| 6,092,705 A | 7/2000 | Meritt ......................... 224/275 |
| 6,097,448 A | 8/2000 | Perkins ....................... 348/837 |
| 6,216,927 B1 | 4/2001 | Meritt ......................... 224/275 |
| 6,283,299 B1 * | 9/2001 | Lee |
| 6,330,337 B1 * | 12/2001 | Nicholson et al. |
| 6,339,696 B1 * | 1/2002 | Chan et al. |
| 6,393,745 B1 | 5/2002 | Miki ........................... 40/586 |
| 6,434,459 B2 * | 8/2002 | Wong et al. |
| 6,473,315 B2 | 10/2002 | Denmeade .................. 361/831 |
| 6,522,368 B1 | 2/2003 | Tuccinardi et al. ......... 348/837 |
| 6,663,155 B1 * | 12/2003 | Malone et al. ............. 296/37.8 |
| 6,678,892 B1 * | 1/2004 | Lavelle et al. ................ 725/75 |

* cited by examiner

Primary Examiner—Krista Bui
(74) Attorney, Agent, or Firm—F. Chau & Associates LLC (57) ABSTRACT

There is provided a display device for a vehicle. At least one video signal source outputs at least one video signal corresponding to at least one video program. Two or more displays receive the at least one video signal and simultaneously display the at least one video program. An assembly housing encloses at least a portion of the at least one video signal source and supports at least one of the two or more displays. A bus couples the at least one of the two or more displays to the at least one media source when the at least one of the two or more displays is supported by the assembly housing, and wherein each of the two or more displays has a capability of operating while being remote from the assembly housing.

51 Claims, 7 Drawing Sheets

VEHICLE DISPLAY DEVICE FOR SIMULTANEOUSLY DISPLAYING ONE OR MORE VIDEO PROGRAMS ON SEPARATE DISPLAYS

RELATED APPLICATION DATA

This present application is a continuation-in-part of commonly assigned U.S. application Ser. No. 09/698,916, filed on Oct. 27, 2000, and entitled "Multimedia Entertainment Unit".

TECHNICAL FIELD

The present invention relates generally to vehicles and, in particular, to a display device for a vehicle. The display device is capable of simultaneously displaying one or more video programs on separate displays.

BACKGROUND DESCRIPTION

As cars have been continuously updated to include new and useful features for the enjoyment and/or utility of a driver and his or her passengers, devices generally found in the home have made their way into cars as optional features. Such features include the television, the video cassette player (VCP), and the digital video disk (DVD) player. These features undoubtably provide enjoyment and/or utility to the driver and/or passengers of a vehicle. For example, children may become occupied by, for example, watching a moving and, thus, may leave the driver better able to concentrate on operating the vehicle. Moreover, passengers in a vehicle undertaking a long journey may better pass the time by viewing a movie.

However, conventional vehicle video devices have been limited to a single display. Thus, only one video program may be viewed at a given time. Moreover, depending on the location of the single display, not all vehicle occupants may be able to view the single display.

Accordingly, there is a need for a vehicle display device that is capable of simultaneously displaying one or more video programs on separate displays.

SUMMARY OF THE INVENTION

The problems stated above, as well as other related problems of the prior art, are solved by the present invention, a vehicle display device for simultaneously displaying one or more video programs on separate displays.

According to an aspect of the present invention, there is provided a display device for a vehicle. At least one video signal source outputs at least one video signal corresponding to at least one video program. Two or more displays receive the at least one video signal and simultaneously display the at least one video program. An assembly housing encloses at least a portion of the at least one video signal source and supports at least one of the two or more displays. A bus couples the at least one of the two or more displays to the at least one media source when the at least one of the two or more displays is supported by the assembly housing, and wherein each of the two or more displays has a capability of operating while being remote from the assembly housing.

According to another aspect of the present invention, the display device further comprises a connector for electrically coupling the at least one of the two or more displays to the bus when the at least one of the two or more displays is supported by the assembly housing.

According to yet another aspect of the present invention, the at least one of the two or more displays comprises a screen, and the connector flexibly couples the at least one of the two or more displays to the bus such that the at least one of the two or more displays folds against the assembly housing to protect the screen.

According to still yet another aspect of the present invention, the at least one media source is adapted to output at least two video signals corresponding to at least two video programs, and the two or more displays are adapted to receive the at least two video signals and to display the at least two video programs.

According to a further aspect of the present invention, at least two of the two or more displays respectively and simultaneously display at least two different ones of the at least two video programs.

These and other aspects, features and advantages of the present invention will become apparent from the following detailed description of preferred embodiments, which is to be read in connection with the accompanying drawings.

DETAILED DESCRIPTION OF PREFERRED EMBODIMENTS

It is to be understood that the present invention may be implemented in various forms of hardware, software, firmware, special purpose processors, or a combination thereof. Preferably, the present invention is implemented as a combination of both hardware and software, the software being an application program tangibly embodied on a program storage device. The application program may be uploaded to, and executed by, a machine comprising any suitable architecture. The machine may be implemented on a computer platform having hardware such as one or more central processing units (CPU), a random access memory (RAM), and input/output (I/O) interface(s). The computer platform may also include an operating system and microinstruction code. The various processes and functions described herein may either be part of the microinstruction code or part of the application program (or a combination thereof) which is executed via the operating system. In addition, various other peripheral devices may be connected to the computer platform such as an additional data storage device.

It is to be further understood that, because some of the constituent system components depicted in the accompanying Figures may be implemented in software, the actual connections between the system components may differ depending upon the manner in which the present invention is programmed. Given the teachings herein, one of ordinary skill in the related art will be able to contemplate these and similar implementations or configurations of the present invention.

To facilitate a clear understanding of the present invention, a brief description of the invention will now be given, followed by a more detailed description with respect to FIGS. 1–6. As noted above, the invention is directed to a vehicle display device for simultaneously displaying one or more video programs on separate displays. Thus, for example, one vehicle occupant can watch a television video program currently being broadcast while another vehicle occupant can simultaneously watch a previously recorded video program output from a video cassette player (VCP) or a digital video disk (DVD) player. As another example, two vehicle occupants in two different "rows" of a vehicle may each watch the same program on their own display located in their row. Given the teachings of the present invention provided herein, one of ordinary skill in the related art will contemplate these and various other implementations of the present invention while maintaining the spirit and the scope thereof.

Video signals are provided to the displays through, for example, one or more wires, one or more connectors, or even wirelessly; various combinations of the preceding may also be employed (e.g., one display receives video signals via a wired connection and another display receives video signals wirelessly). Corresponding audio may be provided to the vehicle occupants, for example, through wired or wireless headphones, through the existing vehicle audio system, through speakers provided in each of the displays, or any combination thereof. The use of headphones prevents passengers that desire a quiet environment from being disrupted by the reproduction of the audio. The displays may be mounted at a rear portion of a vehicle seat, or may be located anywhere within the vehicle. Moreover, the displays may even be handheld by one or more vehicle occupants. That is, the displays do not have to be coupled to an assembly housing of the display device or even near the assembly housing to operate and display video programs. It is to be appreciated that the connectors described herein may be electrical, mechanical, or a combination thereof.

Figure 1:
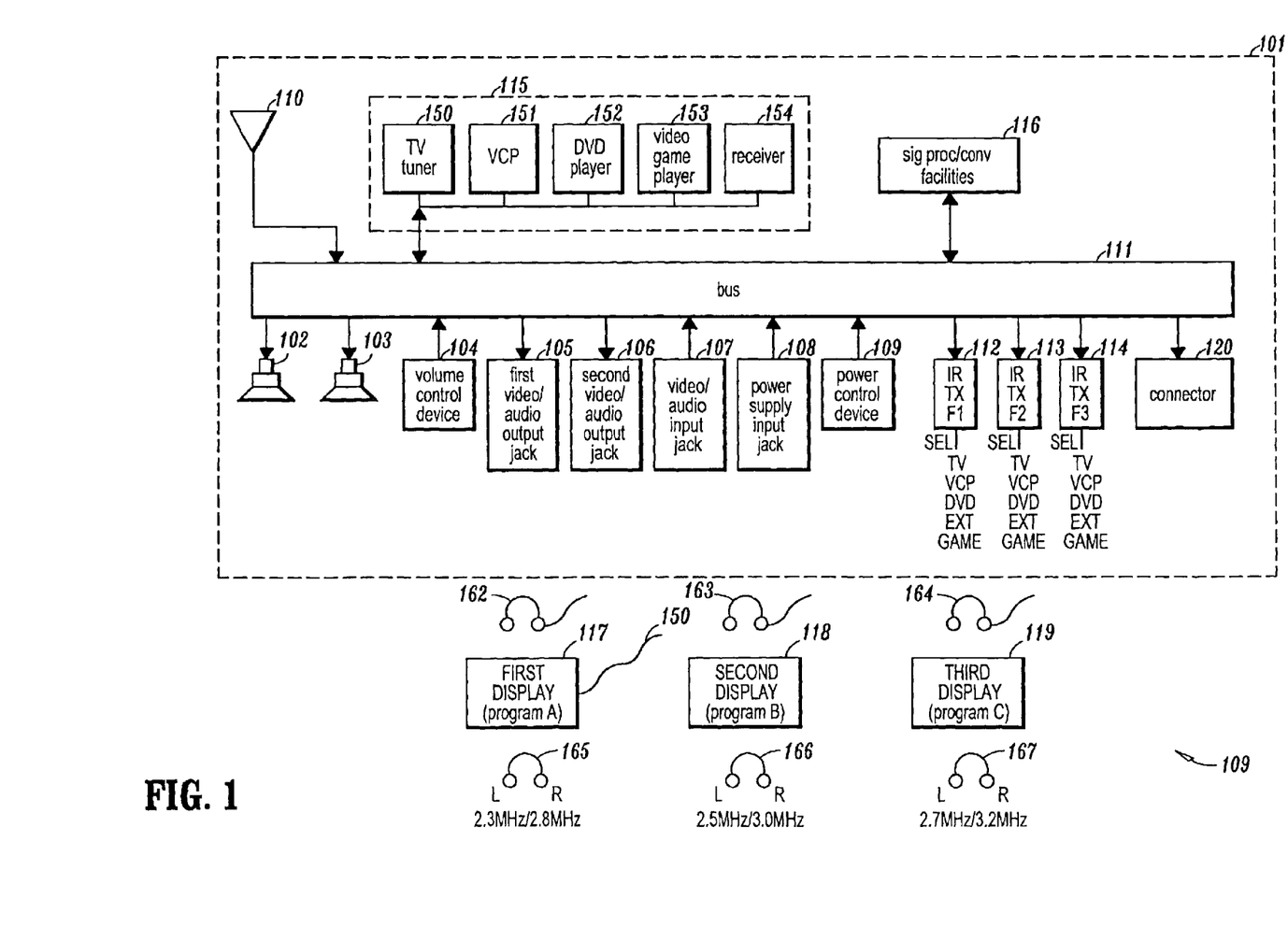
FIG. 1 is a block diagram illustrating the elements of a display device 100 for a vehicle, according to an illustrative embodiment of the invention.
Figure 2:
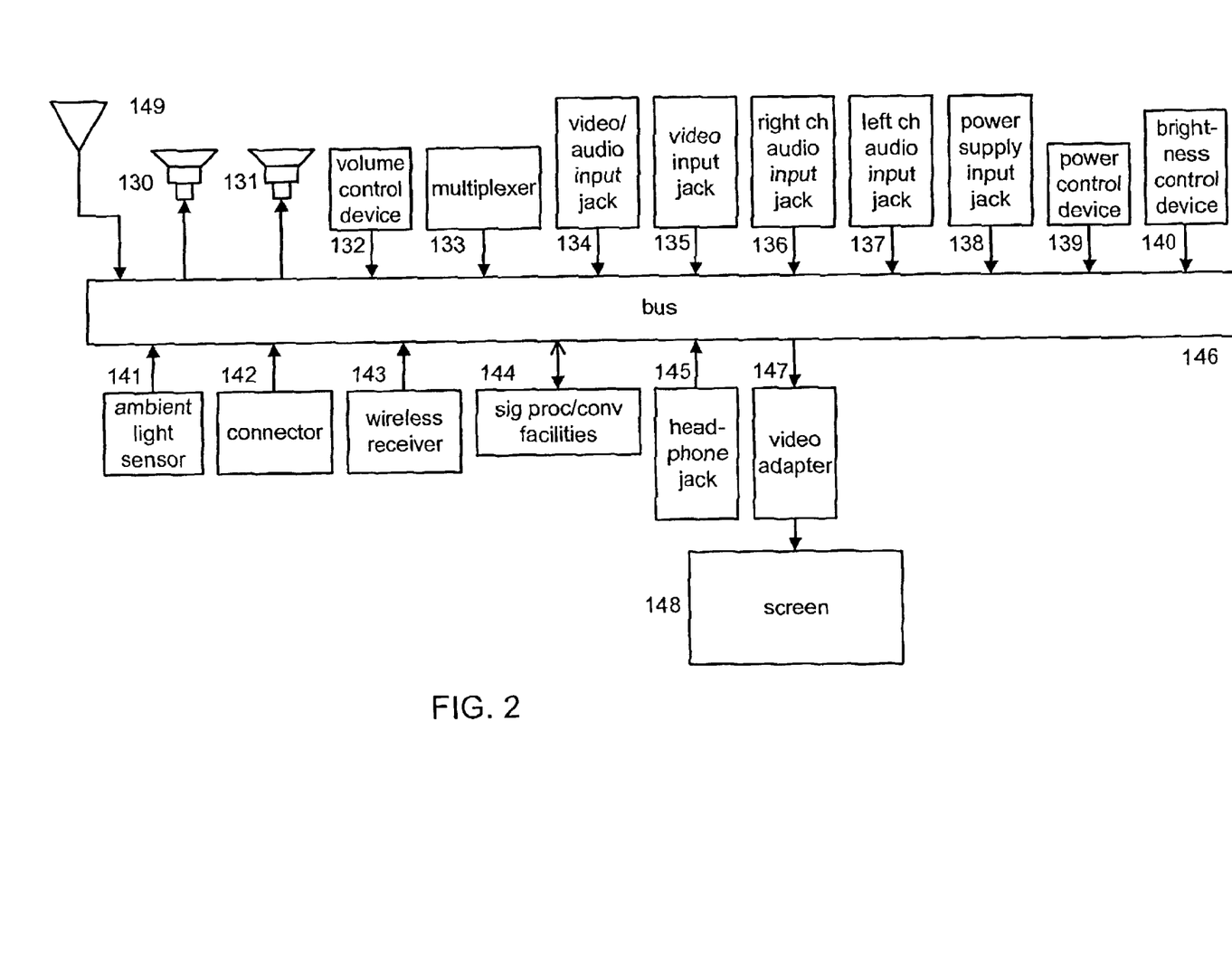
FIG. 2 is a block diagram further illustrating any one of displays 117–119 shown in FIG. 1, according to an illustrative embodiment of the present invention.

FIG. 1 is a block diagram illustrating the elements of a display device 100 for a vehicle, according to an illustrative embodiment of the invention. FIG. 2 is a block diagram further illustrating any one of displays 117–119 shown in FIG. 1, according to an illustrative embodiment of the present invention.

Referring to FIG. 1, the display device 100 includes: an assembly housing 101; a right channel speaker 102; a left channel speaker 103; a volume control device 104 (e.g., a rheostat); a first video/audio output jack 105; a second video/audio output jack 106; a video/audio input jack 107; a power supply input jack 108; a power control device 109 (e.g., on/off switch); an antenna 110; a bus 111; a first wireless transmitter 112; a second wireless transmitter 113; a third wireless transmitter 114; at least one media source 115; facilities for performing signal processing and/or signal conversion 116 (hereinafter "signal processing/conversion facilities"); a first display 117; a second display 118, a third display 119; and a connector 120.

Referring to FIG. 2, the first display 117, the second display 118, and the third display 119 each include: a right channel speaker 130; a left channel speaker 131; a volume control device 132; a multiplexer 133; an video/audio input jack 134; a video input jack 135; a right channel audio input jack 136; a left channel audio input jack 137; a power supply input jack 138; a power control device 139; a brightness control device 140; an ambient light sensor 141; a connector 142; a wireless receiver 143; signal processing/conversion facilities 144; a headphone jack 145; a bus 146; a video adapter 147; a screen 148; and an antenna 149.

The at least one media source 115 may include, for example, any one of the following: a TV tuner 150, a video cassette player (VCP) 151, a digital video disk (DVD) player 152, a video game player 153, a receiver 154 (for wired and/or wireless reception), and so forth. These devices are preferably integrated within the assembly housing 101. The receiver 154 may be employed to receive wireless signals from any external media source such as, for example, a satellite. Moreover, the receiver 154 may receive signals from a VCP or DVD that is external from the assembly housing 101 (i.e., not integrated within the assembly housing 101); in such a case, the VCP, DVD, and so forth would be considered an external input device since they would be external to the assembly housing 101. It is to be appreciated that an external input device such as a VCP or DVD may, as an alternative to being connected to the receiver 154, be directly connected to one or more of the displays 117–119 through an input jack (e.g., first video/audio output jack 105 and/or second video/audio output jack 106) The preceding elements described with respect to the at least one media source 115 (and external input devices) are merely illustrative and, thus, other elements may also be used in accordance with the present invention while maintaining the spirit and scope thereof.

In the illustrative embodiment, video signals may be provided to the displays 117–119 wirelessly or through one or more wires 150 (and corresponding jacks 105–106), one of more connectors (120, 142), and so forth. Audio signals may be provided through the assembly housing speakers 102–103, through the display speakers 130–131, through the existing audio system 161, through wired headphones 162–164 (and corresponding jack(s) 145), through wireless headphones 165–167, and so forth. The wireless transmitters 112–114 may be used to wirelessly transmit video/audio signals to the wireless receiver(s) 143 in the displays 117–119. The wireless transmitters 112–114 may also be used to wirelessly transmit audio signals to wireless receivers (not shown) in the wireless headphones 165–167. It is to be appreciated that while the present invention is shown with three each of the displays, the wired headphones, the wireless headphones, and so forth, the present invention is not limited to the preceding numbers of elements and, thus, any number of such elements may be employed while maintaining the spirit and scope of the present invention; the same is applicable to the other elements of the display device. It is to be further appreciated that the wireless signals can be any type of wireless signal including, but not limited to, radio frequency and infrared signals. It is to be noted that the current transmission capability (bandwidth) of infrared signals is approximately 1.5 to 2.0 Mbits/sec, with a maximum projected bandwidth of 16 Mbits/sec. Preferably, different frequencies are used to transmit to different devices (e.g., first display 117 uses one frequency, second display 118 uses another frequency, and so forth) and also for different channels (e.g., right and left). For example, wireless headphone 165 may use a frequency of 2.3 MHz for the left channel and 2.8 MHz for the right channel, while wireless headphone 166 may use 2.5 MHz for the left channel and 3.0 MHz for the right channel. Preferably, different frequencies are used for transmitting video to each display, and also for each channel of audio to each display (if provided). In this way, interference can be avoided.

The wireless transmitters 112–114 each have multiplexing capabilities to enable the selection of a particular device (e.g., one of the elements comprised in or that interacts with the at least one media source 115) whose video/audio signal is to be wirelessly transmitted. Selection is made through a SELECT (SEL) input. Of course, wireless transmitters without such multiplexing capabilities may also be used; however, in such a case, a separate multiplexor(s) would be coupled between such transmitters and the video/audio outputs of the at least one media source 115.

The antenna 110 may be employed with the display device 100. For example, antenna 110 may be the original antenna included in the vehicle, which is typically used to receive frequencies associated with AM/FM radio stations and television stations. Such an antenna is typically located in the windshield or protruding from the exterior of the vehicle. Moreover, the antenna 110 may be a special purpose antenna, capability of receiving frequencies corresponding to, for example, satellite communications from a satellite or satellite network. The satellite communications may include movies and other media types (e.g., music, global navigation data, e-mail, and so forth). Of course, the antenna 110 may receive various media types (including those mentioned above)from other types of transmission networks (e.g., land-based).

It is to be appreciated that the display device 100 is not limited to any particular kind of displays. Accordingly, displays may be used which include, but are not limited to, liquid crystal displays (LCDs), light emitting diodes (LEDs), and gas plasma. It is to further appreciated that any variations of the aforementioned types of displays may be used. For example, with respect to liquid crystal displays, active matrix (e.g., thin film transistor) technology or passive matrix (e.g., dual scan) technology may be employed. The displays 117–119 may also employ touch screen technology, so that users can interact with the console by either touching the screen or placing a specified device (e.g., electrostatic pen) near the screen. The displays 117–119 may also employ picture-in-picture technology. In a preferred embodiment of the invention, a liquid crystal display is employed which uses active matrix technology. Moreover, in the preferred embodiment, the ambient light sensor 141 is used to detect ambient light and adjust a brightness and/or contrast of the screen 148 accordingly.

The signal processing/conversion facilities 116 may perform such processing/conversion to video and/or audio signals, prior to such signals being output to, for example, the displays 117–119, the wired headphones 152–154, the wireless headphones 155–157, the assembly housing speakers 102–103, and so forth. Moreover, the signal processing/conversion facilities 144 may perform such processing/conversion to video and/or audio signals prior to reproducing the signals on, for example, the screen(s) 148 or the speakers 130–131 included in the displays 117–119. Of course, other arrangements are possible, including having separate signal processing/conversion facilities for the video signals and the audio signals.

The signal processing/conversion facilities 116, 144 may include, but are not limited to, Digital Signal Processors (DSPs), and facilities for performing encoding/decoding, encrypting/decrypting, compressing/decompressing, analog-to-digital conversion (ADC), digital-to-analog conversion (DAC), error correction, and filtering. Such error correction may include, but is not limited to, Cyclic Redundancy Checking (CRC), Error Correction Code or Error Checking and Correcting (ECC), checksum, and so forth.

It is to be noted that any wireless signals may be encoded to prevent interference between the displays 117–119 and/or the wireless headphones 165–167. Such encoding may be based on technologies such as, for example, spread spectrum technology.

In many cases, the facilities described above may be implemented by one or more codecs. In other cases, additional and/or other circuitry may be required. It is to be appreciated that one of ordinary skill in the related art will contemplate these and various other facilities for performing signal processing and/or signal conversion, while maintaining the spirit and scope of the invention.

Figure 3:
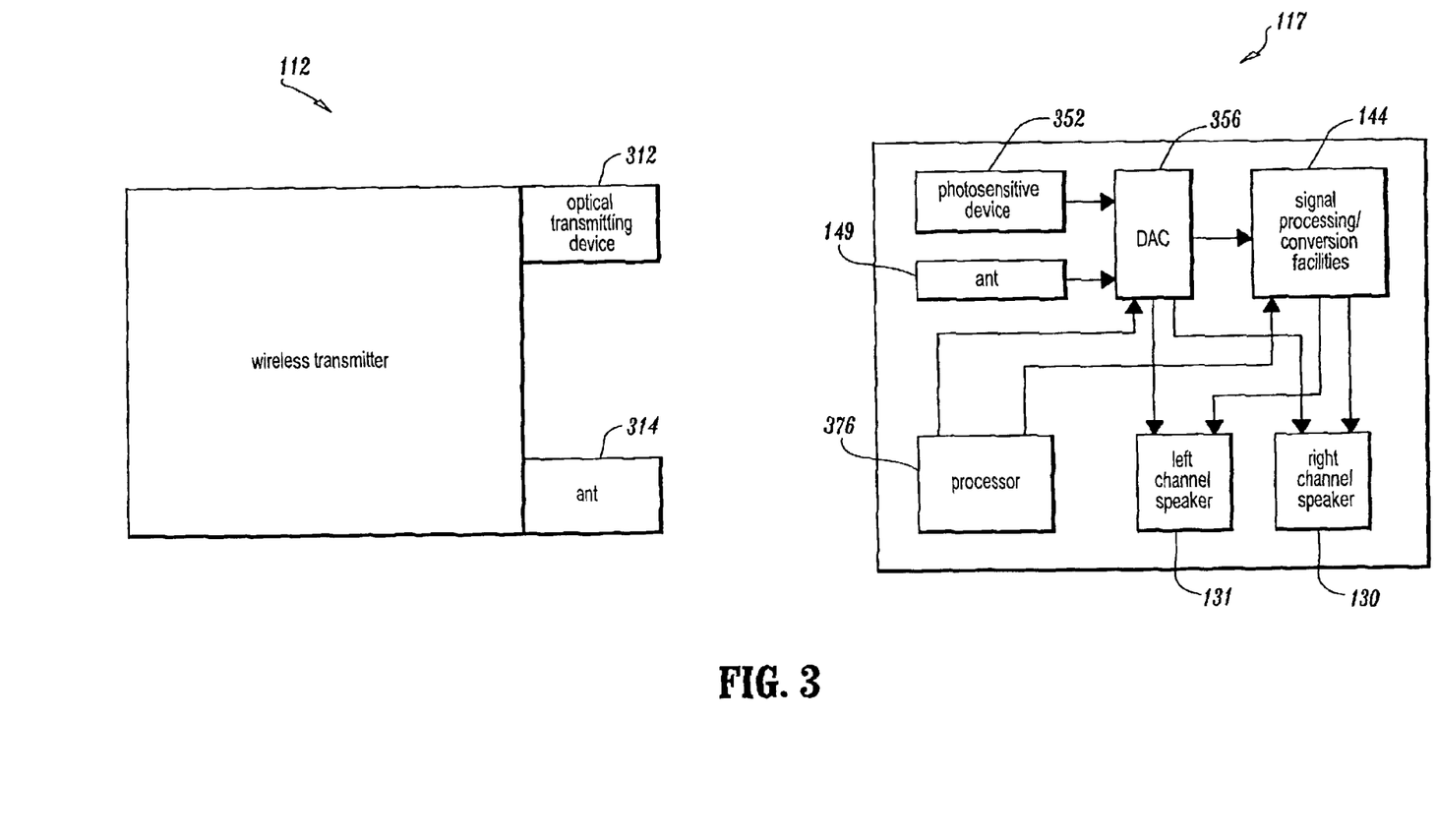
FIG. 3 is a diagram illustrating the wireless transmitter 112 interacting with the display 117 based on optical and/or RF transmission, according to an illustrative embodiment of the invention.

FIG. 3 is a diagram illustrating the wireless transmitter 112 interacting with the display 117 based on optical and/or RF transmission, according to an illustrative embodiment of the invention. It is to be appreciated that the following description is also applicable to the wireless transmitters 113 and 114, the wireless headphones 165–167, and the displays 118 and 119; in such a case, the elements described hereinafter with respect to the wireless transmitter 112 may be considered to be included in the wireless transmitters 113 and 114, and the elements described hereinafter with respect to the display 117 may be considered to be included in the displays 118 and 119 and the wireless headphones 165–167.

The wireless transmitter 112 includes an optical transmitting device 312 (e.g., an LED, a laser, and so forth) and an antenna 314. The display 117 includes a photosensitive device 352 (e.g., a phototransistor, a solar cell(s), a SEED (self-optic effect device), and so forth) and an antenna 149. The optical transmitting device 312 and the photosensitive device 352 are used for wireless transmission and reception of optical signals, respectively. The antenna 314 and the antenna 149 are used for wireless transmission and reception of RF signals, respectively.

In the case of wireless optical transmission, the optical transmitting device 312 wirelessly transmits optical (digital) signals to the display 117 by pulsing its light output (e.g., off equals a zero (0) and on equals a one (1)). The photosensitive device 352 in the display 117 detects the optical signals wirelessly transmitted by the optical transmitting device 312.

The display 117 also includes a digital-to-analog converter (DAC) 356 for converting the digital signals into analog signals.

It is to be appreciated that a processor 376 may be used to control the functions of the DAC 356.

The preceding description regarding the functions of the DAC 356 may also be applied in the case of RF transmission. In such a case, the transmission and reception functions of the optical transmitting device 312 and the photosensitive device 352 are replaced by those of the antennas 314 and 149, respectively. That is, the antenna 314 is used to wirelessly transmit an RF signal which is then received by the antenna 149. A modulator/demodulator may be included or associated with the antennas 314 and 149 to perform such functions as are known to one of ordinary skill in the related art.

Given the teachings of the invention provided herein, one of ordinary skill in the related art will contemplate these and other optical transmitting devices, photosensitive devices, and configurations of the elements of the invention which allow for the transmission and reception of any type of wireless signal (e.g., analog and digital) and appropriate processing/conversion to facilitate reproduction of the content of the wireless signals provided by the wireless transmitter 112.

The preceding description of the display device 100 has primarily focused on features that may be included in the display device 100 to enhance the operation thereof. A description will now be given of various configurations of the present invention by which video/audio signals are provided to the displays.

Figure 4:
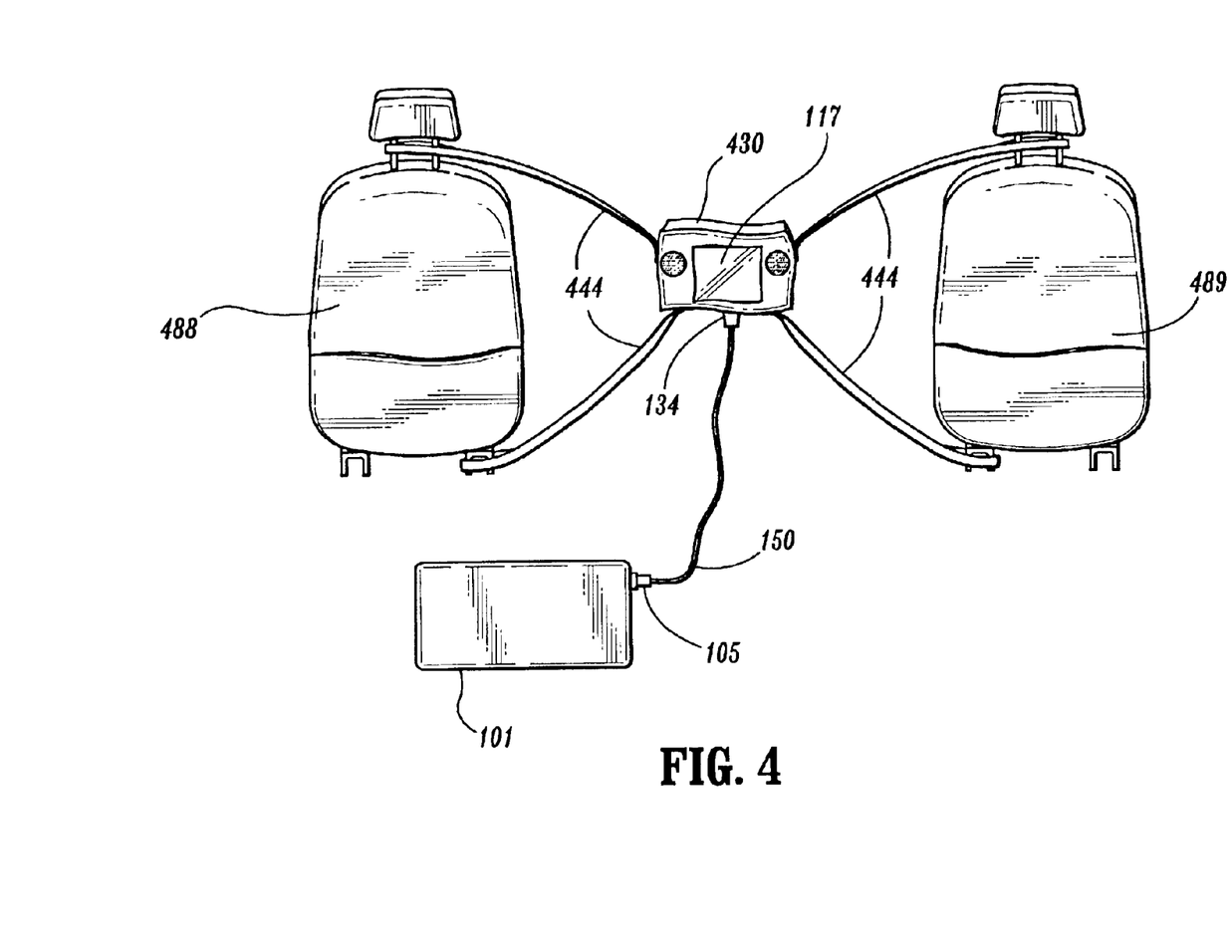
FIGS. 4–6 are diagrams illustrating various configurations of the display device 100 of the present invention, according to various illustrative embodiments thereof.
Figure 5:
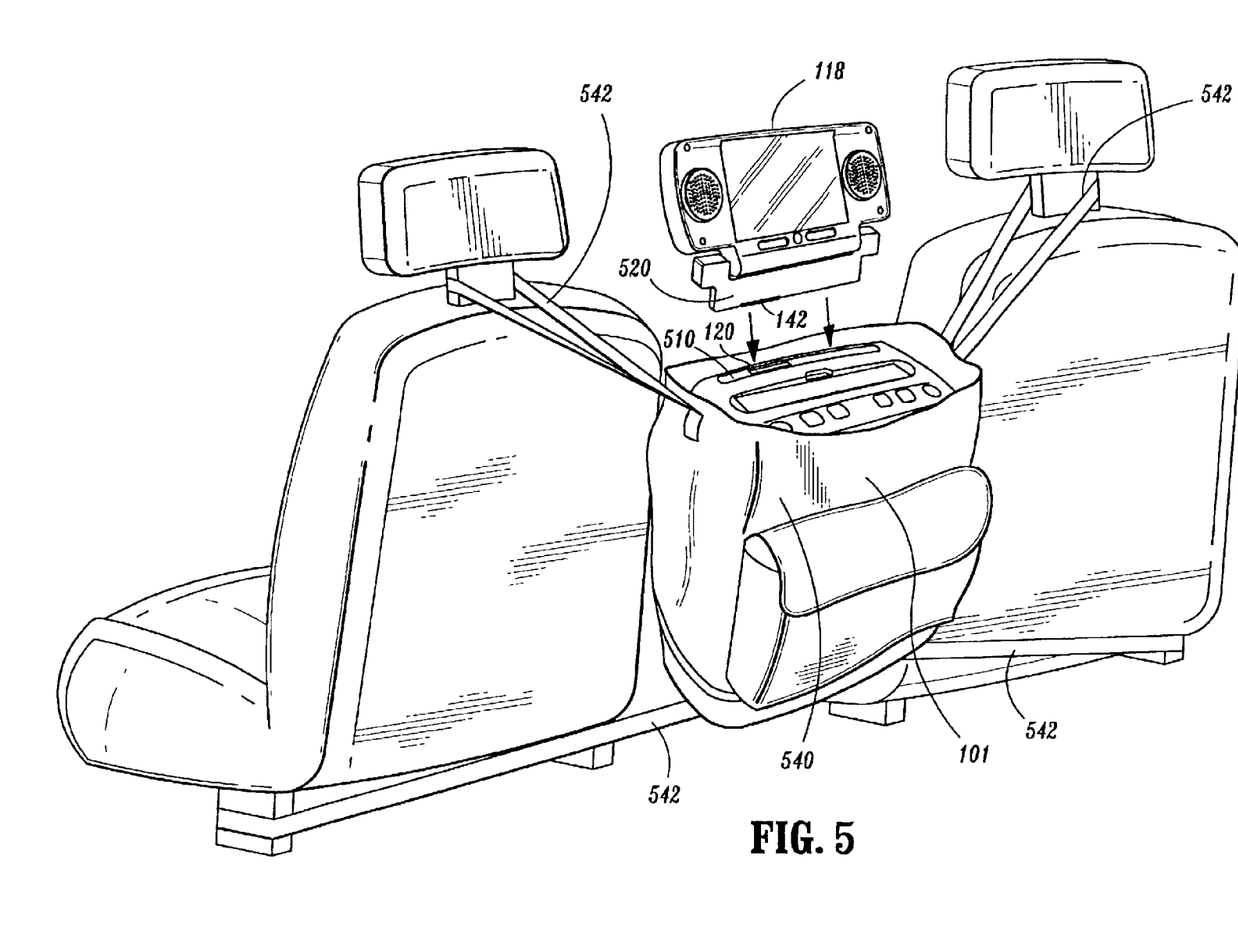
Figure 6:
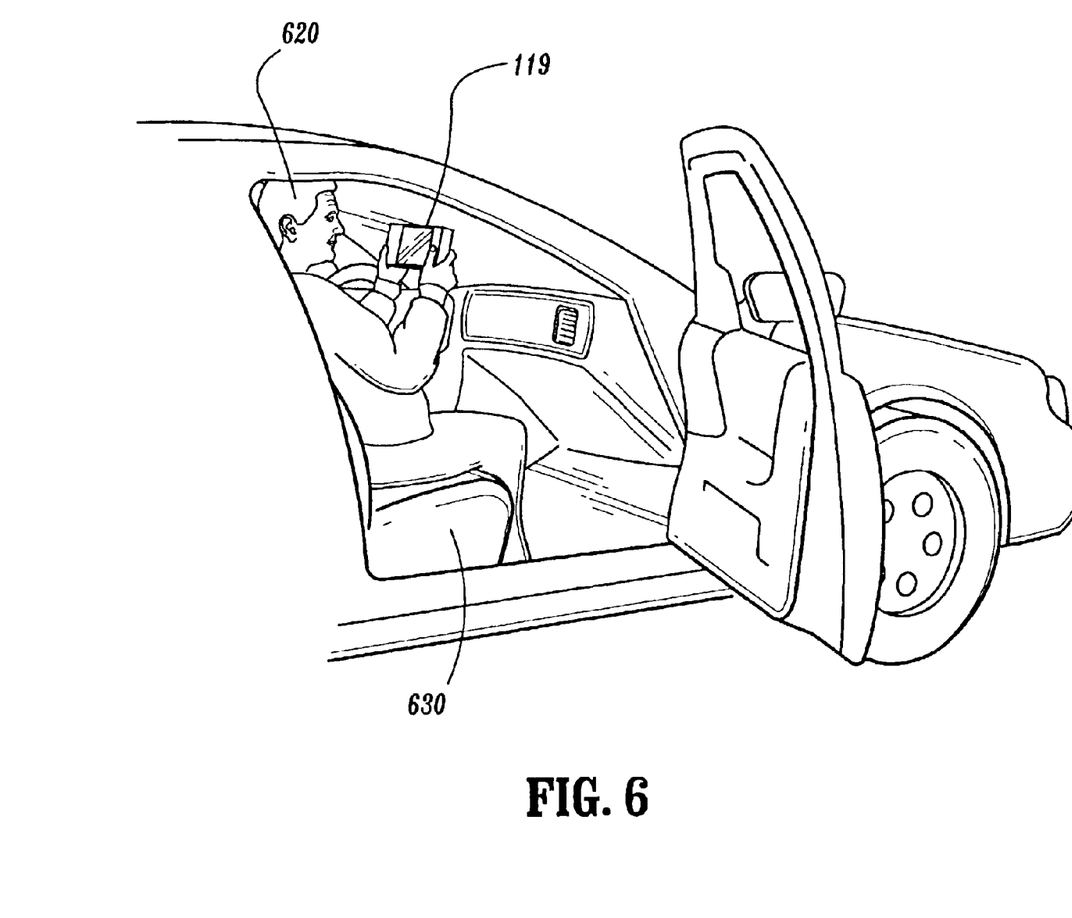

FIGS. 4–6 are diagrams illustrating various configurations of the display device 100 of the present invention, according to various illustrative embodiments thereof. For example, FIG. 4 illustrates display 117 receiving media signals through the use of wires and jacks, FIG. 5 illustrates display 118 receiving media signals through the use of connectors that also provide support for the display device 118 while the display device 118 is in operation, and FIG. 6 illustrates display 119 wirelessly receiving signals. FIGS. 4–6 are shown with the minimum number of elements, so that the mounting arrangements of the display device 100 are emphasized. It is to be appreciated that all three configuration shown in FIGS. 3–6 (as well as other configuration readily contemplated by those of ordinary skill in the related art) may be implemented at different times or concurrently.

In FIG. 4, display 117 is receiving signals through a communication path formed by first video/audio output jack 105, wire 150, and video/audio input jack 134. The signals may include video and audio signals. FIG. 4 also illustrates a mounting arrangement for the display 117 whereby the display 117 is mounted at a rear portion of seats 488, 489 using a bag 430 having a mounting device 444 (e.g., one or more straps, velcro, and so forth). It is to be appreciated that the display 117 may be mounted at the rear portion of the seats or some other location using the bag 430, such that the location of the display 117 is independent of the location of the assembly housing 101.

In FIG. 5, display 118 is receiving signals through a communication path formed by connector 120 and connector 142 being mated together. In this configuration, the connector 120 is within a slot 510 disposed on the assembly housing 101, and the connector 142 is within a protruding member 520 disposed on the display 118. When the protruding member 520 is inserted in the slot 510, the connector 120 is electrically coupled to the connector 142, and the display 118 is supported. Use of this arrangement allows the display 118 to rotate along an axis such that the display 118 can be rotated to be clearly visible to one or more vehicle occupants and also can be rotated to protect the screen 148 when the display 118 is not in use. The signals provided through the connectors may include video and audio signals. FIG. 5 also illustrates a mounting arrangement for the assembly housing 101 whereby the assembly housing 101 is mounted at a rear portion of seats using a bag 540 having a mounting mechanism 542 comprised therein or integrated therewith, with the display 118 oriented towards those passengers located behind the seat.

Figure 7:
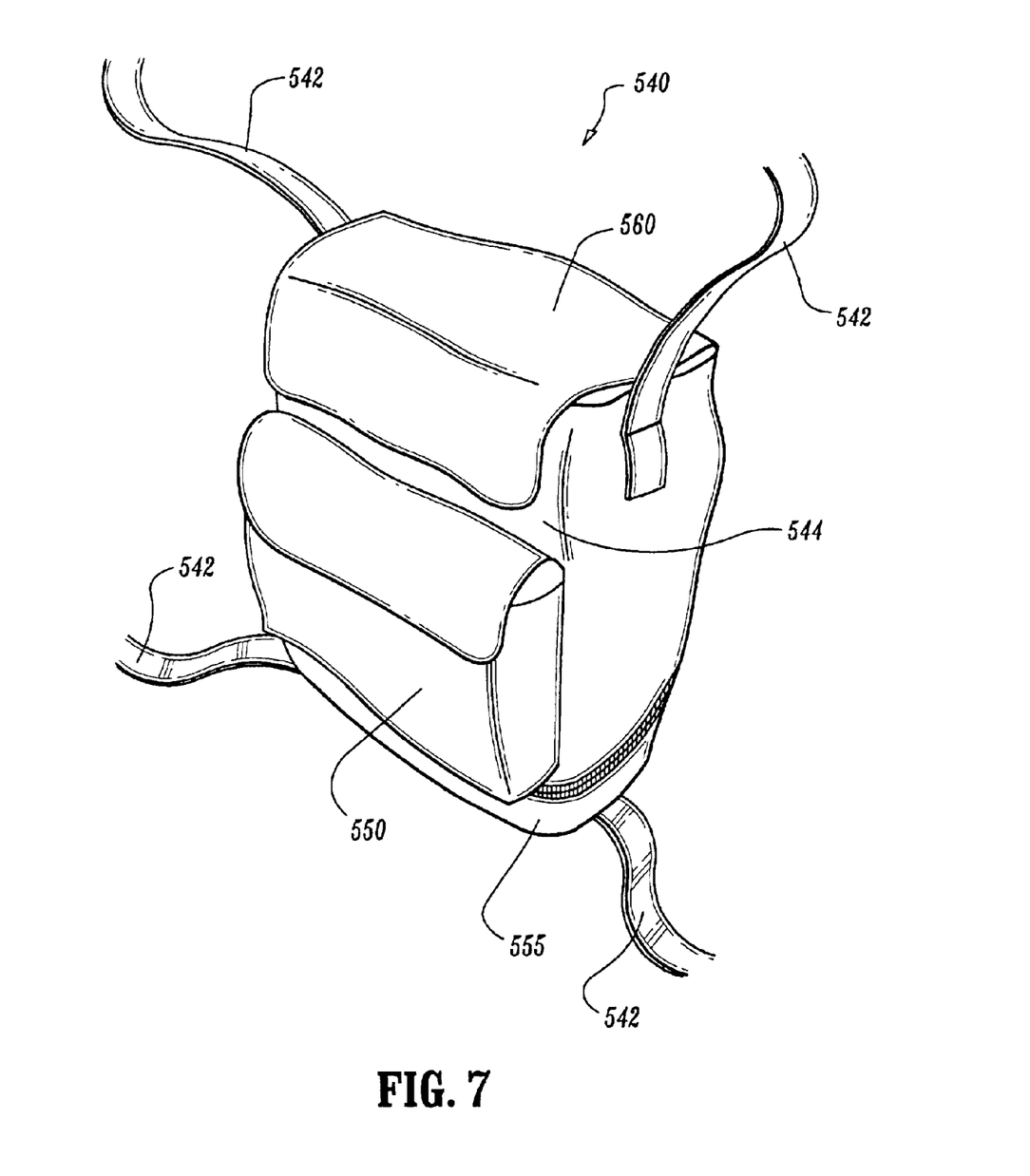
FIG. 7 further illustrates the bag 540 shown in FIG. 5, according to an illustrative embodiment of the present invention.

FIG. 7 further illustrates the bag 540 shown in FIG. 5, according to an illustrative embodiment of the present invention. The bag 540 receives the assembly housing 101 and suspends the assembly housing 101 at a rear of the seat by the mounting mechanism 542, when the assembly housing 101 is in any one of an operational mode and a non-operational mode. The bag 540 comprises at least a main compartment 544 for at least partially encasing at least the assembly housing 101. The main compartment 544 partially encases the assembly housing 101 irrespective of whether one or more of the displays 117–119 is supported by the assembly housing 101. The bag 540 further comprises at least one compartment 550 for encasing at least one of the displays 117–119, when the at least one display is remote from the assembly housing 101. The bag 540 further comprises at least one compartment 555 for encasing accessories corresponding to the display device 100. Such accessories include, but are not limited to: power cords, wired and wireless headphones, video cassette tapes, DVDs, and so forth. The bag 540 further comprises a flap 560, disposed at a top face of the bag, for providing unrestricted viewing access to a given one of the displays 117–119 when the assembly housing 101 is received and suspended by the bag 540 and the given one of the displays 117–119 is supported by the assembly housing 101. The flap 560 further provides access for loading at least a video medium (e.g., video cassette tape, DVD, and so forth) into the at least one media source 115.

In FIG. 6, display 119 is receiving signals through a wireless communication path formed by using the wireless transmitter 114 and the wireless receiver 143. The signals may include audio and video signals. Alternatively, video signals may be provided to the display 119 through the preceding communication path, with the audio signals being provided to the wireless headphones 167. FIG. 6 also illustrates an implementation of the present invention where the display 119 is held in the hands of one of the vehicle occupants 620 sitting in a seat 630; alternatively, the display 119 could simply be placed at a location (on a seat, console, etc.) and viewed at that location.

Given the teachings of the present invention provided herein, one of ordinary skill in the related art will contemplate these and various other configurations interactions, and mounting arrangements between the elements of a display device according to the present invention, while maintaining the spirit and scope thereof.

Although the illustrative embodiments have been described herein with reference to the accompanying drawings, it is to be understood that the present system and method is not limited to those precise embodiments, and that various other changes and modifications may be affected therein by one skilled in the art without departing from the scope or spirit of the invention. All such changes and modifications are intended to be included within the scope of the invention as defined by the appended claims.

What is claimed is:

1. A display device for a vehicle, comprising:
    at least one video signal source for outputting at least one video signal corresponding to at least one video program;
    two or more displays for receiving the at least one video signal and for simultaneously displaying the at least one video program;
    an assembly housing for enclosing at least a portion of said at least one video signal source and for supporting at least one of said two or more displays;
    a bus for coupling said at least one of said two or more displays to said at least one media source when said at least one of said two or more displays is supported by said assembly housing, and wherein each of said two or more displays has a capability of operating while being remote from said assembly housing; and
    a connector for electrically coupling said at least one of said two or more displays to said bus when said at least one of said two or more displays is supported by said assembly housing, wherein:
        said connector is integrated into a member for physically mounting said at least one of said two or more displays on said assembly housing,
        removal of said member from said assembly housing electrically disconnects said at least one of said two or more displays from said bus, and said member is disposed on and provides support for said at least one of said two or more displays.

2. The display device according to claim 1, wherein the connector allows for selective coupling and decoupling of said at least one of said two or more displays to and from said bus and said member allows for selective mounting and dismounting of said at least one of said two or more displays on and from said assembly housing.

3. The display device according to claim 1, wherein said at least one of said two or more displays comprises a screen, and said member flexibly couples said at least one of said two or more displays to said assembly housing such that said at least one of said two or more displays folds against said assembly housing to protect the screen.

4. The display device according to claim 1, wherein said at least one media source is adapted to output at least two video signals corresponding to at least two video programs, and said two or more displays are adapted to receive the at least two video signals and to display the at least two video programs.

5. The display device according to claim 4, wherein at least two of said two or more displays respectively and simultaneously display at least two different ones of the at least two video programs.

6. The display device according to claim 4, wherein each of said two or more displays respectively and simultaneously display a same one of the at least two video programs.

7. The display device according to claim 1, wherein said at least one media source comprises at least one of a television tuner, a video cassette player (VCP), a digital disk (DVD) player, and a video game player.

8. The display device according to claim 1, wherein said at least one media source comprises a receiver for receiving the at least one video signal from at least one external input device.

9. The display device according to claim 1, wherein said at least one media source outputs at least one audio signal corresponding to the at least one video program, said display device further comprises at least one wireless transmitter operatively coupled to said at least one media source for wirelessly transmitting the at least one audio signal to at least one wireless headphone set, and each of said two or more displays comprise a wireless receiver for wirelessly receiving the at least one audio signal.

10. The display device according to claim 9, wherein the at least one audio signal is wirelessly transmitted as a radio frequency signal or an infrared signal.

11. The display device according to claim 1, wherein said display device further comprises at least one wireless transmitter operatively coupled to said at least one media source for respectively and wirelessly transmitting the at least one video signal to said two or more displays, and each of said two or more displays comprise a wireless receiver for wirelessly receiving the at least one video signal.

12. The display device according to claim 11, wherein the at least one video signal is wirelessly transmitted as a radio frequency signal or an infrared signal.

13. The display device according to claim 1, wherein at least one of said two or more displays employs at least one of a liquid crystal display (LCD) technology, light emitting diodes (LEDs), and a gas plasma.

14. The display device according to claim 1, wherein at least one of said two or more displays comprises a mounting device for mounting at a rear portion of a seat, independent of a location of the assembly housing.

15. The display device according to claim 1, wherein each of said two or more displays comprises at least one speaker for reproducing audio signals corresponding to the at least one video program.

16. The display device according to claim 1, wherein each of said two or more displays comprises at least one input jack for receiving audio or video signals.

17. The display according to claim 4, wherein each of said two or more displays comprises a multiplexer for selecting one of the at least two video programs.

18. The display device according to claim 1, wherein each of said two or more displays comprises a power supply jack for receiving power from an external power supply.

19. The display device according to claim 1, wherein the vehicle includes at least one seat, and said assembly housing mounts at a rear portion of the at least one seat.

20. The display device according to claim 1, further comprising at least one speaker, disposed within the assembly housing, for reproducing audio signals corresponding to the at least one video program.

21. The display device according to claim 1, further comprising signal processing facilities adapted to perform at least one of signal processing and signal conversion, with respect to the at least one video signal.

22. The display device according to claim 21, wherein said signal processing facilities are adapted to perform at least one of digital signal processing, encoding, decoding, encrypting, decrypting, compressing, decompressing, analog-to-digital conversion (ADC), digital-to-analog conversion (DAC), and error correction.

23. A display device for a vehicle having a seat, comprising:
  at least one media source for outputting at least one video signal corresponding to at least one video program;
  two or more displays for respectively receiving the at least one video signal and for respectively and simultaneously displaying the at least one video program;
  an assembly housing for enclosing at least a portion of said at least one media source and for supporting at least one of said two or more displays;
  a bag for receiving said assembly housing and suspending said assembly housing at a rear of the seat when said assembly housing is in any one of an operational mode and a non-operational mode;
  a bus for coupling said at least one of said two or more displays to said at least one media source when said at least one of said two or more displays is supported by said assembly housing, and wherein each of said two or more displays has a capability of operating while being remote from said assembly housing and irrespective of whether said assembly housing is received and suspended by said bag;
  a member disposed on said at least one of said two or more displays for mounting said at least one of said two or more displays on said assembly housing; and
  an electrical connector for electrically coupling said at least one of said two or more displays to said bus, wherein said electrical connector is integrated into said member for electrically disconnecting said at least one of said two or more displays from said bus when said member is removed from said assembly housing.

24. The display device according to claim 23, wherein said bag comprises a mounting mechanism for suspending said assembly housing to the rear of the seat.

25. The display device according to claim 23, wherein said bag comprises at least a main compartment for at least partially encasing at least said assembly housing.

26. The display device according to claim 25, wherein the main compartment partially encases said assembly housing irrespective of whether at least one of said two or more displays is supported by said assembly housing.

27. The display device according to claim 23, wherein said bag comprises at least one compartment for encasing at least one of said two or more displays, when said at least one of said two or more displays is remote from said assembly housing.

28. The display device according to claim 23, wherein said bag comprises at least one compartment for encasing accessories corresponding to the display device.

29. The display device according to claim 23, wherein said bag comprises a flap, disposed at a top face of the bag, for providing unrestricted viewing access to a given one of said two or more displays when said assembly housing is received and suspended by said bag and said given one of said two or more displays is supported by said assembly housing.

30. The display device according to claim 29, wherein the flap further provides access for loading at least a video medium into said at least one media source.

31. A display device for a vehicle, comprising:
a media source for outputting a video signal corresponding to a video program;
a display for receiving the video signal and displaying the video program;
an assembly housing for enclosing at least a portion of said media source and supporting said display;
a first bag for receiving media and said assembly housing;
a second bag for receiving said display when said display is operated while being remote from said assembly housing, said second bag adapted to attach to an interior element of the vehicle at a position remote from the first bag;
a bus for coupling said display to said media source when said display is supported by said assembly housing;
a member disposed on said display for selectively mounting said display on said assembly housing; and
an electrical connector within said member for connecting said display to said bus, wherein removal of said member from said assembly housing electrically disconnects said display from said bus.

32. The display device according to claim 31, wherein the vehicle includes a seat, and said first bag suspends said assembly housing at a rear of the seat.

33. The display device according to claim 31, wherein the vehicle includes a seat, and said second bag suspends said display at a rear of the seat.

34. The display device according to claim 33, in said second bag comprises at least one strap for suspending said display from the seat.

35. The display device according to claim 32, wherein said display has a capability of displaying the video signal when said assembly housing is received and suspended by said first bag or when said display is received and suspended by said second bag.

36. The display device according to claim 31, further comprising a wireless transmitter for wirelessly transmitting the video signal, and wherein said display comprises a wireless receiver for wirelessly receiving the video signal.

37. The display device according to claim 31, wherein said media source has a capability of outputting at least two video signals corresponding to at least two video programs, and said display has a capability of receiving the at least two video signals and displaying the at least two video programs.

38. The display device according to claim 37, wherein said display comprises a multiplexer for selecting one of the at least two video programs for display.

39. The display device according to claim 31, further comprising another display for receiving the video signal and displaying the video program.

40. The display device according to claim 31, wherein said media source has a capability of outputting at least two video signals corresponding to at least two video programs, and said display device comprises at least two displays for receiving the at least two video signals and displaying the at least two video programs.

41. The display device according to claim 40, wherein one of the at least two displays displays one of the at least two video programs and another one of the at least two displays displays an another one of the at least two video programs.

42. The display device according to claim 40, further comprising a wireless transmitter for wirelessly transmitting the at least two video signals, and wherein each of said at least two displays comprises a wireless receiver for wirelessly receiving the at least two video signals.

43. The display device according to claim 40, wherein each of said at least two displays comprises a multiplexer for selecting one of the at least two video programs for display.

44. The display device according to claim 23, wherein the combination of the member and the electrical connector integrated into the member allows for selective coupling and decoupling of said at least one of said two or more displays to and from said bus and said assembly housing.

45. A display device for a vehicle, comprising:
at least two video signal sources for outputting at least two video signals corresponding to at least two video programs, respectively;
two or more displays for receiving the at least two video signals, wherein a first display is capable of displaying a first video program of the at least two video programs while a second display simultaneously displays a second video program of the at least two video programs;
an assembly housing for enclosing at least a portion of said at least two video signal sources and for supporting at least one of said two or more displays;
a bus for coupling said at least one of said two or more displays to said at least two video signal sources when said at least one of said two or more displays is supported by said assembly housing, and wherein each of said two or more displays has a capability of operating while being remote from said assembly housing; and
at least two wireless transmitters operatively coupled to said at least two video signal sources for wirelessly transmitting the at least two video signals to said two or more displays, wherein:
a first transmitter is capable of wirelessly transmitting a first video signal corresponding to the first video program on a first frequency while a second transmitter simultaneously wirelessly transmits a second video signal corresponding to the second video program on a second frequency;
each of the first and second displays comprise a wireless receiver tunable to the first or second frequency for wirelessly receiving the at least two video signals; and
the wireless receivers of the first and second displays are capable of being respectively tuned to the first and second frequencies for respectively receiving the first and second video programs.

46. A display device for a vehicle having a seat, comprising:
at least two media sources for outputting first and second video signals corresponding to first and second video programs;

at least two displays for receiving the first and second video signals and for respectively and simultaneously displaying the first and second video programs;

an assembly housing for enclosing at least a portion of said two media sources and for supporting at least one of said at least two displays;

a bus for coupling said at least one of said at least two displays to said at least two media sources when said at least one of said at least two displays is supported by said assembly housing, and wherein each of said at least two displays has a capability of operating while being remote from said assembly housing; and at least two wireless transmitters operatively coupled to said at least two media sources for wirelessly transmitting the first and second video signals to said at least two displays, wherein each of said at least two displays comprise a wireless receiver for wirelessly receiving the first and second video signals, and the first and second video signals are encoded for preventing interference between the at least two displays respectively and simultaneously displaying the first and second video programs.

47. The display device according to claim 45, wherein the first and second video signals are encoded using spread spectrum technology.

48. The display device according to claim 46, wherein the first and second video signals are encoded using spread spectrum technology.

49. The display device according to claim 46, wherein the first and second video signals are wirelessly transmitted on different frequencies.

50. The display device according to claim 49, wherein the first and second video signals are wirelessly transmitted from respective first and second wireless transmitters of the at least two wireless transmitters.

51. A display device for a vehicle, comprising:

at least two video signal sources for outputting at least two video signals corresponding to at least two video programs, respectively;

two or more displays for receiving the at least two video signals, wherein a first display is capable of displaying a first video program of the at least two video programs while a second display simultaneously displays a second video program of the at least two video programs; and at least two wireless transmitters operatively coupled to said at least two video signal sources for wirelessly transmitting the at least two video signals to said two or more displays, wherein:

a first transmitter is capable of wirelessly transmitting a first video signal corresponding to the first video program on a first frequency while a second transmitter simultaneously wirelessly transmits a second video signal corresponding to the second video program on a second frequency; and each of the first and second displays comprise a wireless receiver tunable to the first or second frequency for wirelessly receiving the at least two video signals.

* * * * *